(12) United States Patent
Koralski et al.

(10) Patent No.: US 7,636,897 B2
(45) Date of Patent: Dec. 22, 2009

(54) SYSTEM AND METHOD FOR PROPERTY-BASED FOCUS NAVIGATION IN A USER INTERFACE

(75) Inventors: Atanas Georgiev Koralski, Redmond, WA (US); Henry David Hahn, Bellevue, WA (US); Sundaram Ramani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 10/993,672

(22) Filed: Nov. 19, 2004

(65) Prior Publication Data

US 2006/0117267 A1 Jun. 1, 2006

(51) Int. Cl.
*G06F 3/048* (2006.01)
(52) U.S. Cl. .................. 715/767; 715/817; 715/822
(58) Field of Classification Search ......... 715/766–767, 715/777, 802, 822, 810, 817, 821, 823
See application file for complete search history.

(56) References Cited

U.S. PATENT DOCUMENTS

| | | | |
|---|---|---|---|
| 4,745,405 A | 5/1988 | Himelstein | |
| 5,164,713 A | 11/1992 | Bain | |
| 5,544,299 A * | 8/1996 | Wenstrand et al. | 715/804 |
| 5,565,887 A | 10/1996 | McCambridge | |
| 5,613,120 A * | 3/1997 | Palay et al. | 717/165 |
| 5,625,763 A * | 4/1997 | Cirne | 715/767 |
| 5,673,401 A * | 9/1997 | Volk et al. | 725/139 |
| 5,701,139 A | 12/1997 | Weinbaum | |
| 5,774,111 A | 6/1998 | Lecland | |
| 5,798,752 A | 8/1998 | Buxton | |
| 5,808,604 A | 9/1998 | Robin | |
| 5,915,253 A * | 6/1999 | Christiansen | 707/103 R |
| 5,973,689 A | 10/1999 | Gallery | |
| 6,034,689 A * | 3/2000 | White et al. | 715/854 |
| 6,072,485 A * | 6/2000 | Barnes et al. | 715/802 |
| 6,215,490 B1 * | 4/2001 | Kaply | 715/788 |
| 6,249,284 B1 * | 6/2001 | Bogdan | 715/764 |
| 6,252,592 B1 * | 6/2001 | King et al. | 715/764 |
| 6,266,043 B1 | 7/2001 | Robin | |
| 6,549,221 B1 * | 4/2003 | Brown et al. | 715/854 |
| 6,606,106 B1 * | 8/2003 | Mendenhall et al. | 715/854 |
| 6,654,038 B1 * | 11/2003 | Gajewska et al. | 715/802 |
| 6,717,600 B2 | 4/2004 | Dutta | |

(Continued)

OTHER PUBLICATIONS

Office Action dated Jul. 23, 2007 cited in related U.S. Appl. No. 10/993,535 (Copy Attached).

(Continued)

*Primary Examiner*—Weilun Lo
*Assistant Examiner*—William Wong
(74) *Attorney, Agent, or Firm*—Workman Nydegger

(57) ABSTRACT

An improved system and method for focus navigation behavior specification in a user interface is provided. To this end, an application may include declarations that may associate a focus navigation resource with a user interface object and a focus navigation behavior may be dynamically selected for changing the input focus in the user interface. A focus navigation engine may be provided for applying a number of focus navigation behaviors for moving input focus within and among logical groups of user interface objects. A visual representation of the user interface objects with the applied focus navigation behavior may be generated and a display representation may be rendered for presentation on a user interface display.

21 Claims, 7 Drawing Sheets

U.S. PATENT DOCUMENTS

| | | | |
|---|---|---|---|
| 6,538,670 | B1 | 3/2005 | Kido |
| 6,907,580 | B2 * | 6/2005 | Michelman et al. ......... 715/856 |
| 6,918,090 | B2 * | 7/2005 | Hesmer et al. .............. 715/760 |
| 7,098,933 | B1 | 8/2006 | Thoemmes |
| 7,194,702 | B1 | 3/2007 | Peasley |
| 7,240,299 | B2 | 7/2007 | Abrams |
| 2001/0017634 | A1 * | 8/2001 | Scott .......................... 345/767 |
| 2002/0158920 | A1 * | 10/2002 | Abrams ....................... 345/856 |
| 2002/0163542 | A1 * | 11/2002 | Costea et al. ................ 345/781 |
| 2003/0117440 | A1 * | 6/2003 | Hellyar et al. .............. 345/767 |
| 2003/0137538 | A1 * | 7/2003 | Hesmer et al. .............. 345/760 |
| 2003/0174170 | A1 * | 9/2003 | Jung et al. .................. 345/767 |
| 2003/0231210 | A1 * | 12/2003 | Anderson et al. ........... 345/767 |
| 2004/0001706 | A1 * | 1/2004 | Jung et al. .................. 386/125 |
| 2004/0075699 | A1 | 4/2004 | Franchi |
| 2004/0090463 | A1 * | 5/2004 | Celik et al. ................. 345/767 |
| 2004/0100500 | A1 * | 5/2004 | Chung et al. ................ 345/767 |
| 2004/0205513 | A1 * | 10/2004 | Chen et al. ................ 715/501.1 |
| 2005/0071785 | A1 * | 3/2005 | Chadzelek et al. .......... 715/854 |
| 2005/0086610 | A1 | 4/2005 | Mackinlay |
| 2005/0091596 | A1 * | 4/2005 | Anthony et al. ............. 715/712 |
| 2005/0210399 | A1 * | 9/2005 | Filner et al. ................. 715/767 |
| 2006/0010402 | A1 | 1/2006 | Undasan |
| 2006/0112346 | A1 * | 5/2006 | Miksovsky et al. ......... 715/764 |
| 2007/0113205 | A1 * | 5/2007 | Bogdan et al. .............. 715/825 |
| 2007/0124686 | A1 * | 5/2007 | Ramani et al. .............. 715/741 |

OTHER PUBLICATIONS

Office Action dated Jan. 11, 2008 cited in related U.S. Appl. No. 10/993,535 (Copy Attached).

Office Action dated Jun. 23, 20/08 cited in related U.S. Appl. No. 10/993,535 (Copy Attached)\.

Office Action dated Feb. 5, 2009 cited in U.S. Appl. No. 10/993,535 (Copy Attached).

* cited by examiner

```
                                                  ┌─ 402
┌───────────────────────────────────────────────────────────────────────┐
│                                                                       │
│   namespace System.Windows.Controls                                   │
│   {                                                                   │
│   public sealed class KeyboardNavigation                              │
│     {                                                                 │
│       public static readonly DependencyProperty ControlTabNavigationProperty= ...; │
│       public static readonly DependencyProperty DirectionalNavigationProperty= ...; │
│       public static readonly DependencyProperty TabNavigationProperty = ...; │
│                                                                       │
│       public static void SetTabNavigation(FrameworkElement e, KeyNavigationMode mode); │
│       public static KeyNavigationMode GetTabNavigation(FrameworkElement e); │
│       public static void SetControlTabNavigation(FrameworkElement e, KeyNavigationMode mode); │
│       public static KeyNavigationMode GetControlTabNavigation(FrameworkElement e); │
│       public static void SetDirectionalNavigation(FrameworkElement e, KeyNavigationMode mode); │
│       public static KeyNavigationMode GetDirectionalNavigation(FrameworkElement e); │
│     }                                                                 │
│                                                                       │
│   }                                                                   │
└───────────────────────────────────────────────────────────────────────┘
```

(labels: 404, 408, 410, 412, 414, 416, 418, 420, 422, 424)

FIG. 4A

```
                                                  ┌─ 426
┌───────────────────────────────────────────────────────────────────────┐
│                                                                       │
│   public namespace System.Windows.Controls                            │
│   {                                                                   │
│       public enum KeyNavigationMode                                   │
│       {                                                               │
│           Continue,                                                   │
│           Once,                                                       │
│           Cycle,                                                      │
│           None,                                                       │
│           Contained,                                                  │
│           Local,                                                      │
│       }                                                               │
│   }                                                                   │
└───────────────────────────────────────────────────────────────────────┘
```

(labels: 428, 430, 432, 434, 436, 438, 440)

FIG. 4B

SYSTEM AND METHOD FOR PROPERTY-BASED FOCUS NAVIGATION IN A USER INTERFACE

CROSS-REFERENCE TO RELATED APPLICATIONS

The present invention is related to the following copending United States Patent Application filed concurrently herewith, assigned to the assignee of the present invention, and hereby incorporated by reference in its entirety, "System and Method for Directional Focus Navigation,".

FIELD OF THE INVENTION

The invention relates generally to computer systems, and more particularly to an improved system and method for property-based focus navigation behavior specification in a user interface.

BACKGROUND OF THE INVENTION

When creating computer application, a developer typically may chose a particular environment, or platform on which the application will ultimately be executed. For example, when writing and application, the developer may choose to develop the application to run on the MICROSOFT WINDOWS© platform. As a result, the program developer may have different options available for defining how to change the input focus of a user interface object during interactions with a user of the application. An application developer may program the application with default focus navigation behavior provided by the platform or may create customized focus navigation behavior for specifying the order in which input focus may change from one user interface element to another.

Although functional, this process suffers certain drawbacks. For instance, in order to customize focus navigation for a particular system, a developer may be required to explicitly specify the order in which user interface elements should receive input focus when input for changing focus may be received. Although some systems may allow an application developer to specify the order in which logical navigation may change focus of a user interface element, such as by defining a tab index to determine which user interface element will be given input focus when the tab key on a keyboard is pressed, such a specified order may be applied globally for the user interface elements. If the application developer desires a different order for a specific group of user interface elements, customized code may need to be written by the application developer to perform focus navigation in a different order for each such group of user interface elements. This may become a cumbersome and repetitive process since the customized focus navigation code may only apply to one group of user interface elements and the process of customizing the focus navigation for other groups of user interface elements may need to be repeated for each group of user interface elements where a different order is desired for changing input focus.

What is needed is a way for an application developer to customize the behavior of focus navigation for user interface elements and more easily define how focus navigation will behave for the user interface elements during interactions with a user of the application. Moreover, such a system and method should allow a developer to use such a defined focus navigation behavior for other user interface elements.

SUMMARY OF THE INVENTION

Briefly, the present invention provides an improved system and method for focus navigation in a user interface. To this end, an application may include declarations that may associate a focus navigation resource with a user interface object and a focus navigation behavior may be dynamically selected for changing the input focus in the user interface. The focus navigation resource may define property values that may be selectively applied to specify a desired focus navigation strategy. A focus navigation engine may be provided for applying a focus navigation resource to a user interface object to dynamically change the input focus of the user interface object. Furthermore, a property engine may be provided for locating property values, a tree assembler may be provided for generating a visual representation of the user interface object with the applied property values of a focus navigation resource, and a rendering engine may be provided for rendering a display representation of the visual representation for presentation on a user interface display.

The present invention may also provide methods for property-based focus navigation in a user interface. When a notification of input for focus navigation is received, the user interface object that has the input focus may be located. A logical grouping of user interface objects that includes the user interface object that has input focus and that may have an associated property for the input received may then be located. One or more property values of a focus navigation resource may then be applied to the logical grouping of user interface objects to change the input focus, a visual representation of the user interface objects with the applied property values of the focus navigation resource may be generated, and a display representation of the visual representation may be rendered for presentation on a user interface display.

Advantageously, the present invention may provide a number of focus navigation behaviors for moving input focus within and among logical groups of a user interface objects. The architecture of the present invention may support associating a focus navigation resource with several user interface objects for changing input focus of a user interface object. Thus, an application developer may define a focus navigation resource and may declaratively associate any number of user interface objects with the defined focus navigation resource. Moreover, the focus navigation resource may specify focus navigation behavior locally for a logical group of user interface objects.

Other advantages will become apparent from the following detailed description when taken in conjunction with the drawings, in which:

BRIEF DESCRIPTION OF THE DRAWINGS

FIGS. 4A and 4B present illustrations generally representing an exemplary base class definition for focus navigation functionality and generally representing an exemplary enumeration definition for focus navigation behavior, in accordance with an aspect of the present invention;

DETAILED DESCRIPTION

Exemplary Operating Environment

Figure 1:
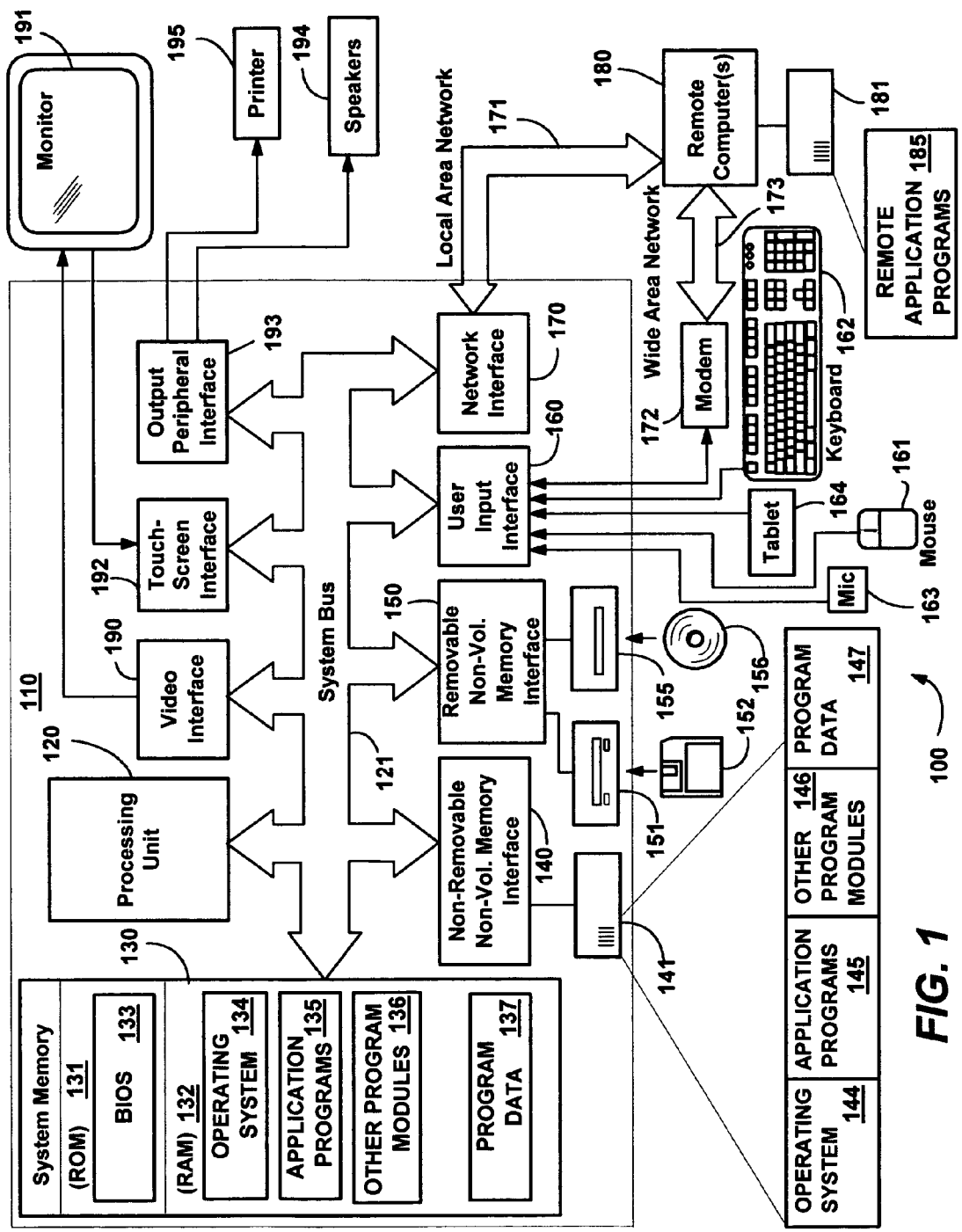
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Property-Based Focus Navigation in a User Interface

The present invention is generally directed towards a system and method for focus navigation in a user interface. As used herein, focus, or input focus, may mean setting a user interface object in a user interface to receive input from an input device or executable code. Focus navigation may mean the process of changing input focus in a user interface. Focus navigation that may be logically defined without necessarily relating to the physical arrangement on a display may be referred to as logical navigation. Focus navigation that may be spatially defined and may relate to the physical arrangement of user interface objects on a display may be referred to as directional navigation.

In particular, the present invention relates to associating a focus navigation resource with a user interface object for dynamically applying a focus navigation behavior to change the input focus in the user interface. Furthermore, the present invention may allow an application developer to define a focus navigation resource and declaratively associate any number of user interface objects with the defined focus navigation resource. As will be seen, the architecture of the present invention may be used for development of many different applications. As will be understood, the various block diagrams, flow charts and scenarios described herein are only examples, and there are many other scenarios to which the present invention will apply.

Figure 2:
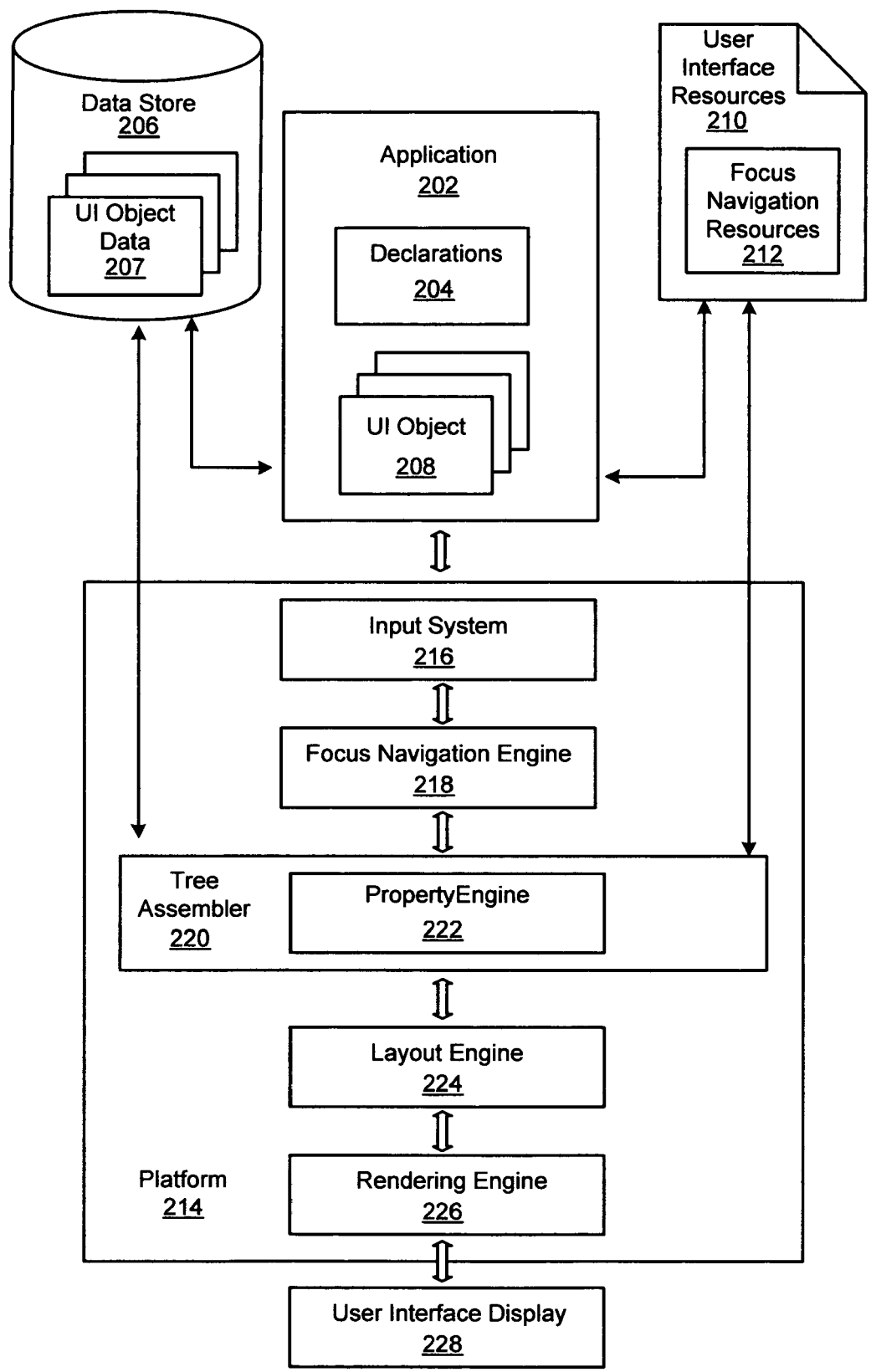
FIG. 2 is a block diagram generally representing an exemplary architecture for associating a focus navigation resource with a user interface object for changing input focus in a user interface, in accordance with an aspect of the present invention.

Turning to FIG. 2 of the drawings, there is shown a block diagram generally representing an exemplary architecture for associating a focus navigation resource with a user interface object for changing input focus in a user interface. Those skilled in the art will appreciate that the functionality implemented within the blocks illustrated in the diagram may be implemented as separate components or the functionality of several or all of the blocks may be implemented within a single component. For example, the functionality of the layout engine 224 may be included in the tree assembler 220, or the functionality of the property engine 222 may be implemented as a separate component from the tree assembler 220. In an embodiment all the components illustrated in FIG. 2 may reside and operate on a single computer system such as system 110 described in conjunction with FIG. 1. Alternatively, one or more of the components illustrated in FIG. 2 may be performed on separate computer systems in a distributed network, as is known to those skilled in the art.

An application 202 may be any executable software code including a kernel component, an application component, a linked library, an object, and so forth. The application 202 may execute on a computer system such as computer system 110 to display elements of a user interface, including a user interface object with input focus, among other things. Each user interface object 208 may include associated methods and events (not shown). In accordance with embodiments of the present invention, the objects may be user interface elements that may be independent of any associated focus navigation resource for changing input focus in a user interface.

In order to associate a focus navigation resource with a user interface object, the application 202 may access user interface resources 210. Among the user interface resources 210, there may be focus navigation resources 212 that may be used in general for developing an application. A focus navigation resource may be stored separately from the user interface objects and may be relatively independent of the user interface objects themselves. The focus navigation resources 212 may be focus navigation definitions developed or designed by the developer of the application 202 or the definitions 212 may be created by a third party. The focus navigation definitions relate to the actual focus navigation properties to be associated with the user interface objects 208 of an application in order to change the input focus in a user interface. The focus navigation resource may influence the display of user interface objects by specifying property values for focus navigation behavior to change the input focus in the user. For instance, focus navigation definitions may include focus navigation properties such as specifying logical navigation, directional navigation, input key(s) used to change input focus, the navigation behavior, and so forth.

In an embodiment, the application 202 may have declarations 204 that may associate properties of the focus navigation resources 212 to user interface objects 208. The declarations 204 may provide the declarative program statement(s) that associates one or more user interface objects to a focus navigation resource. Such an association may be made by explicitly identifying the user interface object and the focus navigation resource, or by providing a default focus navigation resource, or by inheritance from a parent user interface object, or by some other method.

Application 202 may be operably coupled to executer on platform 214. Platform 214 may include the framework of application programming interface (API) that may provide the necessary communication between toe application 202 and the operation system of the computer, such as computer 110 shown in FIG. 1. As such, the platform 214 may provide the intermediate functions and services that may allow the application 202 to ultimately display user interface elements, such as user interface objects 208, on a user interface display 228. Although not shown, the operation system and its necessary operation occur between platform 214 and user interface display 228. In and particular embodiment of the invention, the platform 214 may be the MICROSOFT WINDOWS platform developed by MICROSOFT Corporation.

Within the platform 214, an input system 216 may be responsible for handling all the input received from a user interacting with the application through input devices such as a mouse, stylus on a tablet, keyboard and other types of devices. The focus navigation engine 218 may be operably coupled to the input system 216 for receiving notification of input for focus navigation. The focus navigation engine may include functionality for locating a logical grouping of user interface objects that may have an associated property for the input received and may act on the property associated with the logical grouping of user interface objects to change the input focus.

A tree assembler 220 may be operably coupled to the focus navigation engine 218 and may parse the information received from the application 202 in order to build a "visual tree" which is an internal representation of the display and thus represents the combination of the user interface objects 208 to be displayed and the information from the focus navigation resources 212 that describes how to change the input focus of the user interface objects displayed. In an embodiment, the tree assembler 220 includes a property engine 222 for locating the appropriate property values of focus navigation properties. In an embodiment, the tree assembler 220 may receive the user interface objects and the focus navigation information directly from the application 202. In other embodiments, the tree assembler 220 may create the required user interface objects directly from the data store 206 using data 207 and the focus navigation resources 212, respectively, through the operation of the data binding.

The tree assembler 220 may complete the visual tree and pass the tree to the rendering engine 226. In an embodiment, the tree may be passed relatively directly to the rendering engine 226, which, in turn may use the visual tree to render a display representation of the user interface objects on the user interface display 228. In an alternative embodiment, the visual tree may be passed first to a layout engine 224 that may understand the physical properties of the display such that it may determine where to place certain display items and how large to make them relative to the physical characteristics of a particular computer system. To do so, the layout engine 224 may add more information to the visual tree by using user interface elements from a user interface object factory to complete the tree. The application 202 and the tree assembler 220 may typically operate in a dynamic environment whereby the tree assembler 220 may make an initial visual tree and, as the application 202 runs and display items may change, the tree assembler 220 may rewrite or modify the visual tree to update the display representation on the user interface display 228.

Figure 3:
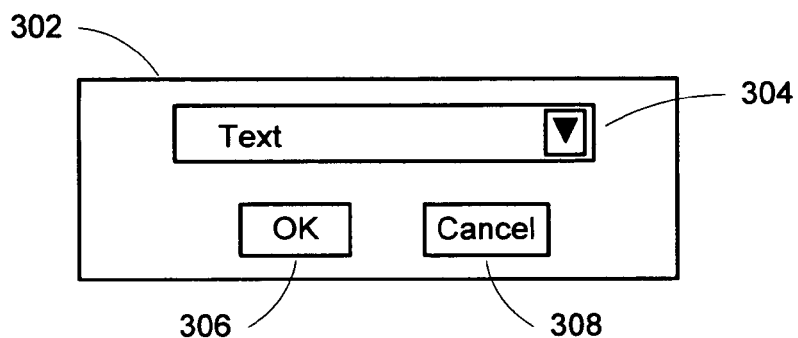
FIG. 3 is an illustration generally representing an exemplary display representation of a user interface object, in accordance with an aspect of the present invention.

FIG. 3 presents an illustration generally representing an exemplary display representation of a user interface object. In general, a user interface object may also be referred to as a user interface element and means herein any visual primitive used to build a graphical user interface screen including without limitation a ListBox, ComboBox, Menu, dialog box, a control, ToolBar, a Frame, a Window, and so forth. A user interface object may include other user interface objects. For example, the DockPanel 302 in FIG. 3 may be a user interface object that includes three other user interface objects: ComboBox 304, Button 306 labeled "OK" and Button 308 labeled "CANCEL". Together, these four user interface objects may form a logical grouping that may have one or more associated focus navigation properties.

It may be important to a user interacting with an application to understand which user interface object may have input focus because each user interface object may respond differently to any input provided. For instance, a user may see the actual text typed on the keyboard within a text box. As another example, a Button may respond by receiving an event from depressing a particular key such as the Enter key. Accordingly, a user interface object that has input focus may be distinguished from other user interface objects in a user interface display by some form of visualization, such as highlighting, to provide an indication to a user interacting with the application which user interface object has input focus.

In one embodiment, the functionality for focus navigation may be provided through the instantiation of an object defined by a static class. FIG. 4A presents an illustration generally representing an exemplary base class definition for focus navigation functionality. The illustration shows a definition of a static class 402 named KeyboardNavigation 404 that may be used to apply focus navigation behavior specified by a property to a logical grouping of user interface objects such as the logical grouping of the four user interface objects discussed above in conjunction with FIG. 3. The exemplary class definition 402 of KeyboardNavigation 404 may include three properties: a logical navigation property that may use the control and tab keys named ControlTabNavigationProperty 408, a directional navigation property named DirectionalNavigationProperty 410, and a logical navigation property that may use the tab key named TabNavigationProperty 412. Additionally, the exemplary class definition of KeyboardNavigation may include six methods: SetTabNavigation 414 for setting the TabNavigationProperty 412 property associated with a user interface object to a keyboard navigation mode, KeyNavigationMode GetTabNavigation 416 for obtaining the TabNavigationProperty 412 mode of a user interface object, SetControlTabNavigation 418 for setting the ControlTabNavigationProperty 408 property associated with a user interface object to a keyboard navigation mode, KeyNavigationMode GetControlTabNavigation 420 for obtaining the ControlTabNavigationProperty 408 mode of a user interface object, SetDirectionalNavigation 422 for setting the DirectionalNavigationProperty 410 property associated with a user interface object to the keyboard navigation mode, and KeyNavigationMode GetDirectionalNavigation 424 for obtaining the DirectionalNavigationProperty 410 mode of a user interface object.

FIG. 4B presents an illustration generally representing an exemplary enumeration definition for focus navigation behavior that may be attached to a user interface object. The illustration shows a definition of an enumeration 426 named KeyboardNavigationMode 428 for by setting either logical or directional navigation to one of the following exemplary values: Continue 430 for moving to the next logical group of user interface objects upon determining that no other user interface objects should be considered within the current logical group, Once 432 for allowing input focus on only one element in a logical group of user interface elements before moving to the next logical group of user interface objects, Cycle 434 for remaining in a logical group by changing input focus to the first or last user interface object within the logical group upon reaching the end or beginning of the logical group, respectively, None 436 for excluding a logical group of user interface objects from receiving input focus Contained 438 for remaining in a logical group by leaving focus on the last or first user interface object after reaching the last or first user interface objects within the logical group, and Local 440 for moving to the next logical group of user interface objects after changing input focus according to tab indexes specified locally for a logical group of user interface objects.

Any application developer may attach one of the defined properties to a logical group of user interface objects to apply a behavior to a logical group of user interface objects. Those skilled in the art will appreciate that other focus navigation classes may be defined and other focus navigation behaviors may be enumerated. For example, a focus navigation class may be defined for any directional input device including a remote control, a phone, or other device with a directional input mechanism.

Figure 5:
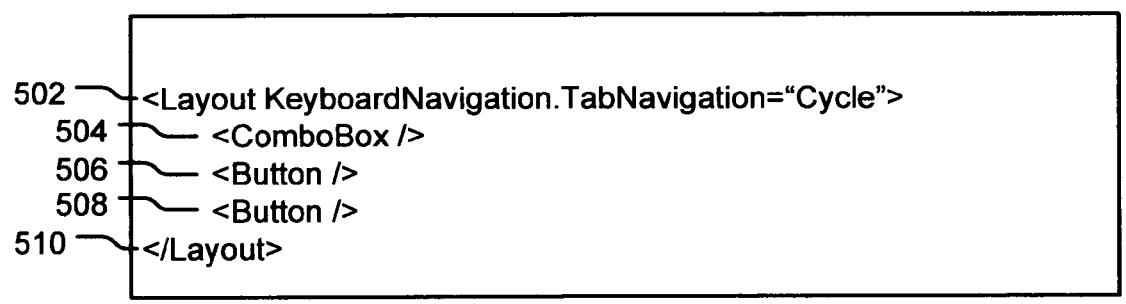
FIG. 5 is an illustration generally representing exemplary markup language for defining a layout of a user interface object with a focus navigation property and assigning a property value to the focus navigation property, in accordance with an aspect of the present invention.

FIG. 5 is an illustration generally representing exemplary markup language for defining a layout of a user interface object with a focus navigation property and assigning a property value to the focus navigation property. Lines 502-510 show a layout definition of a user interface object such as the DockPanel illustrated in FIG. 3. Line 502 illustrates a declaration that may assign the value of "Cycle" to the logical navigation property of TabNavigation. Lines 504-508 may then list the members forming a logical grouping to which the TabNavigation property may be attached. For example, the ComboBox declared on line 504, the Button declared on line 506, and the Button declared on line 508 may form a logical grouping to which the TabNavigation property may be attached. By attaching the TabNavigation property with an assigned behavior of "Cycle", the input focus within the logical grouping may change from one of the user interface objects in the logical grouping to another whenever the tab key may be depressed. More specifically, the input focus may remain in the logical group by cycling among the user interface objects each time the tab key may be depressed.

Figure 6:
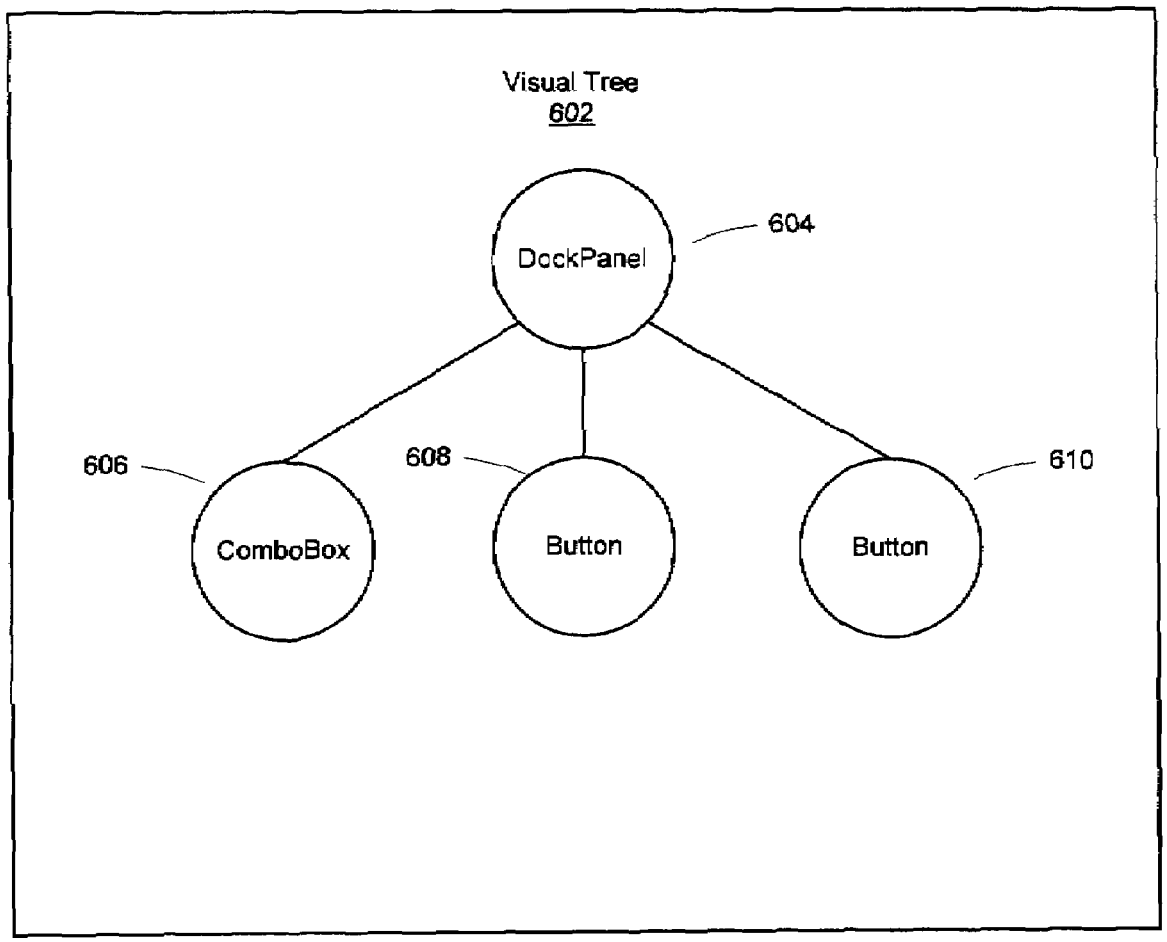
FIG. 6 is an illustration generally representing an exemplary visual tree for a user interface object, in accordance with an aspect of the present invention.

The exemplary layout definition shown in FIG. 5 may be used to build a visual tree representing the layout of a user interface object that may include other user interface objects which together may form a logical grouping of user interface objects. For instance, FIG. 6 presents an illustration generally representing an exemplary visual tree for a user interface object such as the markup declared in FIG. 5. A "visual tree" may be a representation in a tree-like structure having nodes for the visual representation of the user interface objects to be displayed. Not all user interface objects may be in a visual tree because not all user interface elements may have visual information. The DockPanel may be one of many user interface objects presented on a visual display, and, consequently, the visual representation for the DockPanel may be a visual subtree 602 which represents only part of a potentially larger visual tree that may include all the user interface elements presented on a visual display. In general, the tree assembler, such as tree assembler 220 shown in FIG. 2, may set the assigned property values of the DockPanel, create the visual subtree with any applied focus navigation properties, and add the visual subtree to the visual tree.

The first item shown in the visual subtree 602 is a DockPanel item 604. When building the tree, the tree assembler may encounter the DockPanel item in a declaration. Upon encountering the DockPanel declaration, a node for the DockPanel item may be created to be placed in the visual subtree. Next, an inquiry may be performed to determine whether any focus navigation information may be attached to the DockPanel item. Such focus navigation information may include property values of the DockPanel as well as property values of any user interface elements included in the DockPanel which may form a logical grouping of user interface objects. As a result of the inquiry, the tree assembler may subsequently discover the layout definition for the DockPanel on line 502 in FIG. 5 which assigns the value of "Cycle" to the logical navigation property of TabNavigation. The tree assembler may store this property with its assigned value in the node for the DockPanel 604.

The tree assembler may next encounter declaration of user interface elements included in the DockPanel which may form a logical grouping to which the TabNavigation property may be applied. For each of these user interface elements declared, a node may be created and placed underneath the node for the DockPanel 604. For example, a node 606 may be created for the ComboBox declared on line 504 and placed beneath the DockPanel node 604, a node 608 may be created for the Button declared on line 506 and placed beneath the DockPanel node 604, and a node 610 may be created for the Button declared on line 508 and placed beneath the DockPanel node 604. After creating the nodes for the user interface objects included in the DockPanel and adding them to the node for the DockPanel 604, the visual subtree 602 for the DockPanel may be completed and the tree assembler may add the visual subtree to the visual tree.

Upon completing the visual subtree 602 and adding the visual subtree 602 to the visual tree, the visual tree may be passed to a layout engine, such as engine 224 in FIG. 2 for including additional user interface elements prior to being sent to the rendering engine 226. In another embodiment, the layout engine may call the tree assembler as needed to generate the tree just in advance of the layout process. Rendering engine 226 may render a display representation from the visual tree for presentation on a user interface display.

Figure 7:
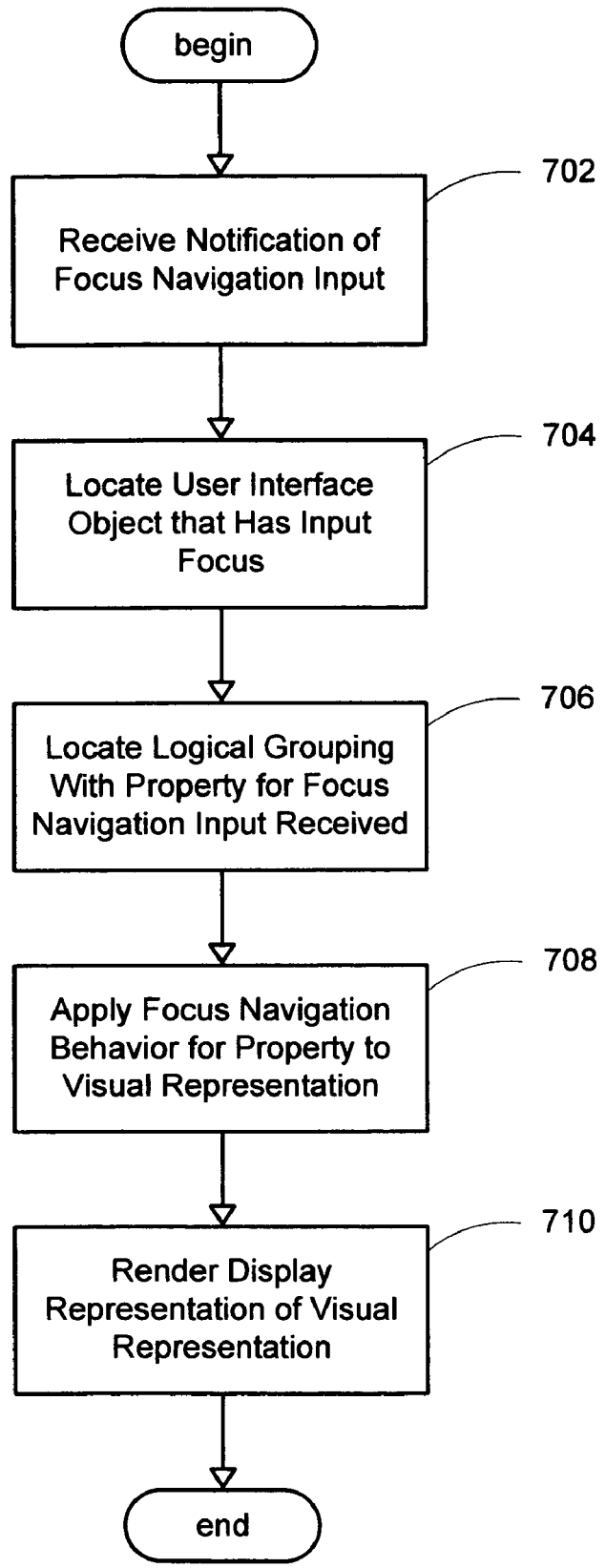
FIG. 7 is a flowchart generally representing example steps undertaken for changing the input focus of a user interface object, in accordance with an aspect of the present invention.

FIG. 7 presents a flowchart generally representing example steps undertaken for changing the input focus of a user interface object. Those skilled in the art will appreciate that an implementation may choose to perform these steps in a different order for purposes of efficiency or flexibility, while achieving the same effect and without departing from the scope of the present invention. In one embodiment, an application such as application 202 in FIG. 2 may be running on a platform, such as platform 214 in FIG. 2, which is executing on a computer system, such as computer system 110 in FIG. 1.

At step 702, notification of focus navigation input may be received. For instance, the tab key on a keyboard may be depressed and notification of the depressed tab key may be communicated by the input system to the focus navigation engine. Upon receiving the notification, the user interface object that has input focus may be located at step 704. After the user interface object that has input focus has been located, the logical grouping that includes the user interface object with input focus and that has an attached property for specifying focus navigation behavior for the focus navigation input received may be located at step 706. If the parent user interface object in the logical grouping that includes the user interface object with input focus does not have an attached property for specifying focus navigation behavior for the focus navigation input received, then the parent of the parent user interface object in the logical grouping that includes the user interface object with input focus may be checked to see whether it may have an attached property for specifying focus navigation behavior for the focus navigation input received. In one embodiment, a search may thus proceed by walking the visual tree to locate a user interface object with an attached property for specifying focus navigation behavior for the focus navigation input received and that may be in a logical grouping that includes the user interface object with input focus.

Upon locating such a user interface object with an attached property for specifying focus navigation behavior for the focus navigation input received, the focus navigation behavior assigned to the attached property may be applied to the visual representation of the logical grouping of user interface objects at step 708 to change the input focus of the user interface object. After applying the focus navigation behavior to the visual representation of the logical grouping of user interface objects, a display representation of the visual representation may be rendered at step 710. Upon rendering the display representation, the process is finished.

There may be several focus navigation behaviors that may be assigned to a property attached to a logical grouping of user interface elements in order to change the input focus of a user interface. For instance, there are six focus navigation behaviors that may be, for example, assigned to the TabNavigation property or the ControlTabNavigation property. To cycle through a logical group of user interface objects, the "Cycle" value may be assigned to a logical navigation property for this focus navigation behavior. The application of the focus navigation behavior for cycling results in changing input focus from one user interface object to the next while remaining in the logical group. After reaching the last or first user interface objects within the logical group, the input focus may be changed by moving the input focus to the first or last user interface object within the logical group, depending upon the direction of the navigation.

Figure 8:
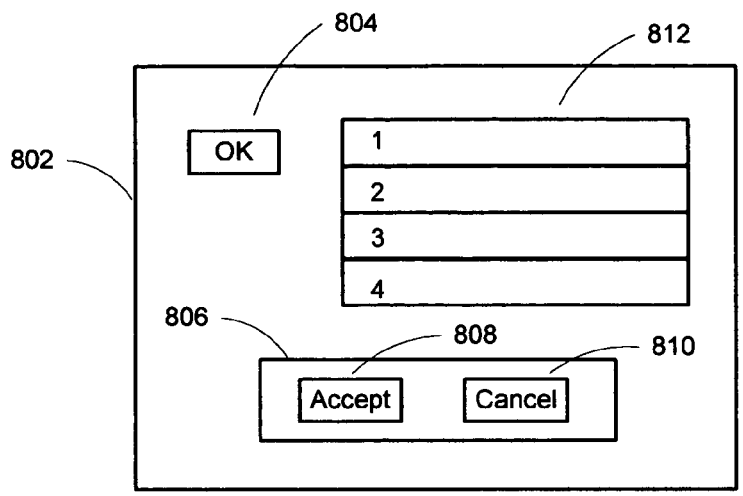
FIG. 8 is an illustration generally representing an exemplary display representation of a user interface object, in accordance with an aspect of the present invention.
Figure 9:
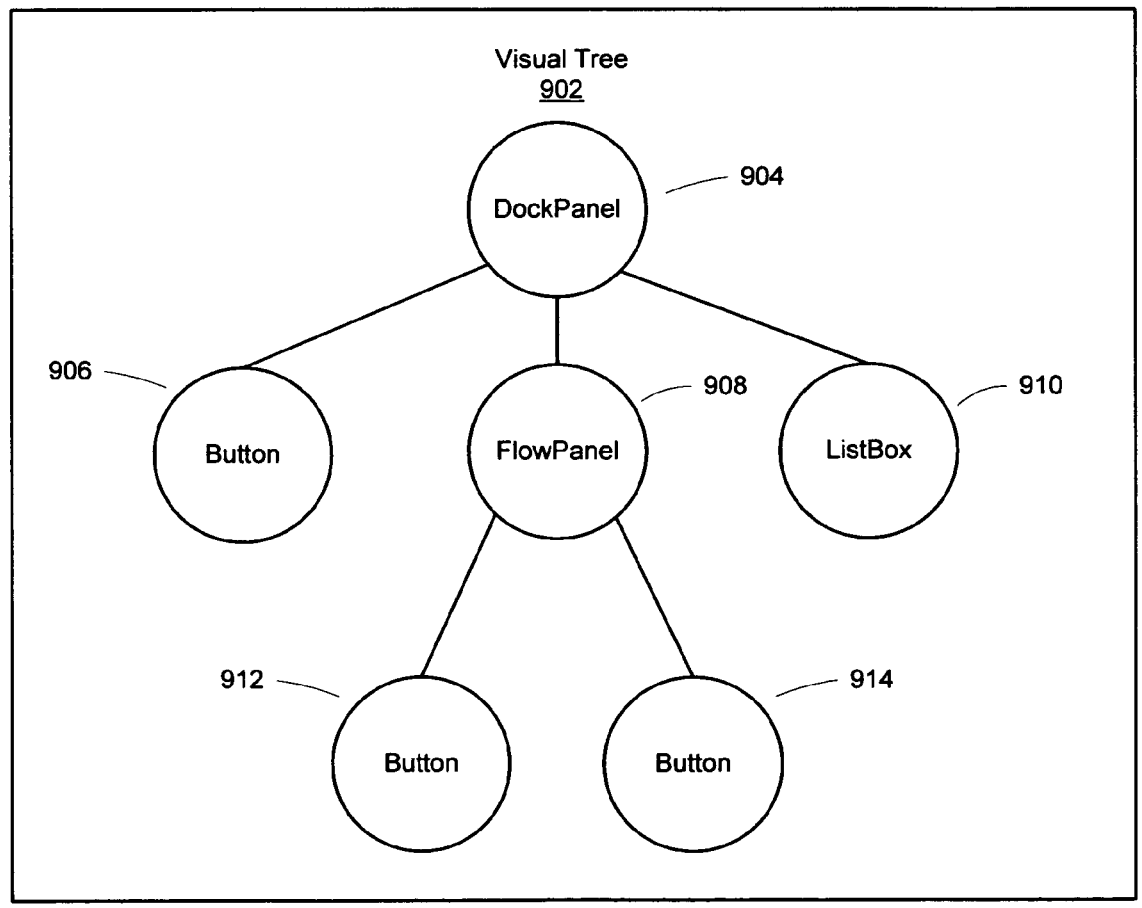
FIG. 9 is an illustration generally representing an exemplary visual tree for the display representation of the user interface object of FIG. 8, in accordance with an aspect of the present invention.

For example, FIG. 8 presents an illustration generally representing an exemplary display representation of a user interface object, namely a DockPanel 802 that may include a Button 804 labeled "OK", a FlowPanel 806 with Button 808 labeled "Accept" and Button 810 labeled "Cancel", and a ListBox 812. FIG. 9 presents an illustration generally representing an exemplary visual tree for the display representation of the user interface object of FIG. 8, namely a visual tree 902 with node 904 for the DockPanel, a node 906 for the "OK" Button, a node 908 for the FlowPanel with a child node 912 for the "Accept" Button and a child node 914 for the "Cancel" Button, and a node 910 for the ListBox. The visual tree 902 may represent the logical grouping of user interface objects for the visual representation of the DockPanel to be displayed. If the focus navigation behavior of cycling may be assigned to the DockPanel 904, the focus navigation behavior for cycling may switch the input focus between the Button 906, the Button 912, the Button 914, and the ListBox 910 and then switch back to Button 906. Or if the navigation direction is opposite, then the focus navigation behavior for cycling may switch the input focus between the ListBox 910, the Button 914, the Button 912, the Button 906, and then switch forward to the ListBox 910. Thus, the input focus may not leave the logical group of user interface objects using this focus navigation behavior.

To cycle through a logical group of user interface objects only once, the "Contained" value may be assigned to a logical navigation property for this focus navigation behavior. The application of this focus navigation behavior results in changing input focus from one user interface object to the next while remaining in the logical group. However, when starting focus navigation from either the first user interface object, Button 906, or the last user interface object, ListBox 910, focus will remain on the respective user interface object, depending upon the direction of the navigation. The input focus may not leave the logical group of user interface objects using this focus navigation behavior. Considering FIG. 9, if the property value of "Contained" was assigned to the logical navigation property attached to the FlowPanel 908, the focus navigation behavior for contained may, for example, switch the input focus between the Button 912 and the Button 914, and then remain on the Button 914. In one embodiment, this focus navigation behavior may operate like cycling if set on the root of a visual tree.

To cycle through a logical group of user interface objects once and then continue on to the next logical group of user interface objects, the "Continue" value may be assigned to a logical navigation property for this focus navigation behavior. The application of this focus navigation behavior results in changing input focus from one user interface object to the next within a logical group, and then, when starting focus navigation from the first or last user interface object, this focus navigation behavior may continue on to the next logical group of user interface objects for setting the input focus depending upon the direction of the navigation. Considering FIG. 9, if the property value of "Continue" was assigned to the logical navigation property attached to the FlowPanel 908, the focus navigation behavior for Continue may, for example, switch the input focus between the Button 912 and the Button 914, and then continue on to the ListBox 910 to apply the behavior associated with the ListBox 910. In one embodiment, this focus navigation behavior may switch among user interface objects within a logical group using a depth first search by walking the visual tree user interface objects in the logical group. In another embodiment, a breadth first search may be used. In yet another embodiment, this focus navigation behavior may operate like the "Contained" focus navigation behavior if set on the root of a visual tree.

To allow input focus only once in a logical group of user interface objects and then continue on to the next logical group of user interface objects, the "Once" value may be assigned to a logical navigation property for this focus navigation behavior. The application of this focus navigation behavior results in allowing logical navigation only on one user interface object within a logical group, and then continues on to the next logical group of user interface objects for changing the input focus. This focus navigation behavior may be applicable to any user interface object such as a control that may have more than one displayable user interface item. After applying input focus on only one user interface object among potentially several in a logical grouping, this focus navigation behavior may move on to another logical grouping of user interface objects to apply the focus navigation that may be associated with that logical grouping.

Considering FIG. 9, if the property value of "Once" was assigned to the logical navigation property attached to the ListBox 910, the focus navigation behavior may, for example, only go to one of the ListBox items such as item 1, and when the tab key may be pressed again, the focus navigation behavior may next leave ListBox 910 to move to another user interface object such as Button 906 to switch the input focus on Button 906. In one embodiment, a user interface object such as a control with more than one displayable user interface item may use this focus navigation behavior to return input focus to the last focused item.

To exclude input focus from a logical group of user interface objects during focus navigation and continue on to the next logical group of user interface objects, the "None" value may be assigned to a logical navigation property for this focus navigation behavior. The application of this focus navigation behavior results in disallowing logical navigation to a logical group of user interface objects for moving input focus. This focus navigation behavior may skip the logical group and continue on to the next logical group of user interface objects for setting the input focus.

To navigate through a logical group of user interface objects using a specified navigation order and then continue on to the next logical group of user interface objects, the "Local" value may be assigned to a logical navigation property for this focus navigation behavior. The application of this focus navigation behavior results in changing input focus from one user interface object to the next within a logical group according to a specified navigation order, and then after all user interface objects within the logical group have had input focus, this focus navigation behavior may continue on to the next logical group of user interface objects for setting the input focus. The order for navigating input focus among user interface objects within a logical group may be defined by Tab Indexes. The scope of Tab Indexes may be defined locally for a logical group and the navigation order for input scope may be defined by assigning a tab index value in Tab Indexes for each user interface object in the logical group. By setting the property of "Local", the scope of Tab Indexes may be specified on the logical group of user interface objects and the order may not be derived from a parent user interface object that may define another order for Tab Indexes. In one embodiment, if Local value is not defined for a logical group, then a globally defined default may be used for the navigation order.

Using the above systems and methods, an application author may provide customized focus navigation behavior for input focus in a user interface. The defined focus navigation behavior may be used for one or more different user interface objects, in accordance with aspects of the present invention. Importantly, the application author can specify focus navigation behavior in a declarative manner to program how a user interface may change input focus. In doing so, the focus navigation resources may be separated from the user interface objects. Consequently, the author or an end user may change the focus navigation resources without changing the user interface objects. Likewise, the author may adjust the user interface objects without changing the focus navigation resources.

As can be seen from the foregoing detailed description, the present invention provides an improved system and method for focus navigation in a user interface. A focus navigation resource may be customized and applied to any type of user interface object to define how input focus may be changed in the user interface during interactions with a user. The architecture of the present invention may support a number of focus navigation behaviors for moving input focus within and among logical groups of a user interface objects. In general, an application developer may define a focus navigation resource and declaratively associate any number of user interface objects with the defined focus navigation resource and, significantly, that focus navigation resource may be used by a developer for user interface objects in any number of other applications. As is now understood, the system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for changing focus between different objects of a user interface and in a declarative manner that allows an application developer to customize how focus changes between the different objects and how navigation of focus between the different objects will behave for the objects during runtime interactions with a user of an application, the computer system comprising:

a processor; and computer-readable media having computer-executable instructions that, when executed by the processor, cause the computer system to:

display, using an application executing on the computer system, a plurality of user interface objects organized in two or more logical groupings, a first user interface object of the plurality of user interface objects being displayed as having input focus;

receive user input;

determine that the user input corresponds to a request from the user to change the input focus from the first user interface object to a different interface object of the plurality of user interface objects, wherein determining that the user input corresponds to the request from the user to change the input focus comprises accessing a focus navigation resource selected as corresponding to the first user interface object and that is separate from the application and separate from all user interface objects and that defines at least one property defining a behavior to be followed by the application when changing the input focus between the different user interface objects;

change the input focus from the first user interface object to the different user interface object, wherein changing the input focus comprises:

accessing the at least one property of the focus navigation resource;

determining that the first user interface object is within a first logical grouping of user interface objects, the first logical grouping having a focus order immediately preceding a second logical grouping of user interface objects;

determining that the at least one property is a once value defining a focus navigation behavior for allowing the input focus to be on only one user interface object within the first logical grouping, before moving the input focus to the second logical grouping;

in response to determining that the at least one property is a once value, changing the input focus to a user interface object of the second logical grouping irrespective of whether there is another user interface object within the first logical grouping that follows the first user interface object within the first logical grouping and irrespective of whether the first user interface object is the last user interface object within the first logical grouping; and display, within the application, the input focus as being changed to the second user interface object.

2. The system of claim 1 further comprising an application means having declarations for associating the focus navigation resource with the first and second user interface objects.

3. The system of claim 1 further comprising an input means for communicating the user input from a device.

4. The system of claim 1 further comprising a tree assembler means for assisting in generating a visual representation of the first and second user interface objects with the at least one property of the focus navigation resource applied to the visual representation.

5. The system of claim 1 further comprising a property locating means for the at least one property of the focus navigation resource.

6. The system of claim 1 further comprising a data store means for persistently storing data of the first and second user interface objects.

7. A method for changing focus between different objects of a user interface and in a declarative manner that allows an application developer to customize how focus changes between the different objects and how navigation of focus between the different objects will behave for the objects during runtime interactions with a user of an application, the method comprising:

displaying, using an application executing on a computing system, a plurality of user interface objects organized in two or more logical groupings, a first user interface object of the plurality of user interface objects being displayed as having input focus;

receiving user input;

determining that the user input corresponds to a request from the user to change the input focus from the first user interface object to a different interface object of the plurality of user interface objects, wherein determining that the user input corresponds to the request from the user to change the input focus comprises accessing a focus navigation resource selected as corresponding to the first user interface object and that is separate from the application and separate from all user interface objects and that defines at least one property defining a behavior to be followed by the application when changing the input focus between the different user interface objects;

changing the input focus from the first user interface object to the different user interface object, wherein changing the input focus comprises:

accessing the at least one property of the focus navigation resource;

determining that the first user interface object is within a first logical grouping of user interface objects, the first logical grouping having a focus order immediately preceding a second logical grouping of user interface objects;

determining whether the at least one property is a once value defining a focus navigation behavior for allowing the input focus to be on only one user interface object within the first logical grouping, before moving the input focus to the second logical grouping;

when the at least one property is determined to be a once value, changing the input focus to a user interface object of the second logical grouping irrespective of whether there is another user interface object within the first logical grouping that follows the first user interface object within the first logical grouping and irrespective of whether the first user interface object is the last user interface object within the first logical grouping; and displaying, within the application, the input focus as being changed to the second user interface object within the second logical grouping.

8. The method of claim 7 further comprising:

when the at least one property is determined not to be a once value, changing the input focus from the first user interface object to another user interface object within the first logical grouping by applying the at least one property of the focus navigation resource to the first logical grouping of user interface objects.

9. The method of claim 7 further comprising providing one or more declarations assigning the focus navigation resource to at least the first user interface object.

10. The method of claim 7 wherein changing the input focus includes accessing the at least one property of the focus navigation resource, the at least one property being a cycle value defining a focus navigation behavior that changes the input focus only between the user interface objects within the first logical grouping.

11. The method of claim 7 wherein changing the input focus includes accessing the at least one property of the focus navigation resource, the at least one property being a contained value defining a focus navigation behavior that changes the input focus once for each user interface object in the first logical grouping and leaves the input focus on the first or last user interface object in the first logical grouping.

12. The method of claim 11 wherein changing the input focus once for each user interface object in the first logical grouping comprises using a depth first search to select the next user interface object in the first logical grouping as organized in a tree.

13. The method of claim 11 wherein changing the input focus once for each user interface object in the first logical grouping comprises using a breadth first search to select the next user interface object in the first logical grouping as organized in a tree.

14. The method of claim 7 wherein changing the input focus includes accessing the at least one property of the focus navigation resource, the at least one property having a value defining a focus navigation behavior changing the input focus once for each user interface object in the first logical grouping and then continuing to the second logical grouping of user interface objects for changing the input focus.

15. The method of claim 7 wherein changing the input focus includes accessing the at least one property of the focus navigation resource, the at least one property having a none value defining a focus navigation behavior that prevents the input focus from being applied to the second logical grouping, and changing the input focus comprises skipping the second logical grouping for changing the input focus and then continuing to a next logical grouping of user interface objects for changing the input focus.

16. The method of claim 7, further comprising navigating through the first logical grouping of user interface objects using a specified navigation order for changing the input focus and then continuing to the second logical grouping of user interface objects for changing the input focus.

17. The method of claim 7 wherein the first logical grouping has a navigation order therein, wherein the navigation order comprises an order of the user interface objects in the first logical grouping as defined by a tab index.

18. The method of claim 17 wherein the order of the tab index comprises has a local scope applicable to the first logical grouping.

19. A computer storage medium having stored thereon computer executable instructions which, when executed, cause a computing system to perform the method of claim 7.

20. A method for changing focus between different objects of a user interface and in a declarative manner that allows an application developer to customize how focus changes between the different objects and how navigation of focus between the different objects will behave for the objects during runtime interactions with a user of an application, the method comprising:

displaying, using an application executing on a computing system, a plurality of user interface objects, a first user interface object of the plurality of user interface objects having input focus;

receiving user input;

generating a visual representation of the plurality of user interface objects within the application in a visual tree structure;

determining that the user input corresponds to a request from the user to change the input focus from the first user interface object to a different interface object of the plurality of user interface objects, wherein determining that the user input corresponds to a request from the user to change the input focus comprises accessing a focus navigation resource selected as corresponding to the first user interface object and that is separate from the application and separate from all user interface objects, that is independent of a plurality of available focus navigation resources which is attachable to any user interface object within the application, and that defines:

one or more input mechanisms that are to be interpreted by the application as requests to change the input focus between different user interface objects, the one or more input mechanisms being defined through an object defined by a static class; and at least one property defining a behavior to be followed by the application when changing the input focus between the different user interface objects;

using the visual tree structure to change the input focus from the first user interface object to the different user interface object, wherein changing the input focus comprises:

accessing the at least one property of the focus navigation resource;

determining that the first user interface object is within a first logical grouping of user interface objects, the first logical grouping having a focus order immediately preceding a second logical grouping of user interface objects;

when the at least one property is a continue value, determining based on the user input whether the first user interface object is a last user interface object within the first logical grouping, and when the first user interface object is the last user interface object within the first logical grouping, changing the input focus to a second user interface object, the second user interface object being part of the second logical grouping, inasmuch as the continue value defines a focus navigation behavior for changing the input focus from the first user interface object within the first logical grouping to the second logical grouping when it is determined no other user interface objects within the first logical grouping should be considered within the first logical grouping;

when the at least one property is a once value, changing the input focus to the second user interface object regardless of whether the first user interface object is the last user interface object within the first logical grouping, inasmuch as the once value defines a focus navigation behavior for allowing the input focus to be on only one user interface object within the first logical grouping, before moving the input focus to the second logical grouping;

when the at least one property includes a cycle value, determining based on the user input whether the first user interface object is the last user interface object within the first logical grouping, and when the first user interface object is the last user interface object within the first logical grouping, changing the input focus to a third user interface object, the third user interface object being the first user interface object within the first logical grouping, inasmuch as the cycle value defines a focus navigation behavior for maintaining the input focus within the first logical grouping by changing the input focus to the first user interface object within the first logical grouping upon reaching the last user interface object of the first logical grouping; and when the at least one property includes a contained value, determining based on the user input whether the first user interface object is the last user interface object within the first logical grouping, and when the first user interface object is the last user interface object within the first logical grouping, leaving the input focus on the first user interface object, inasmuch as the contained value defines a focus navigation behavior for maintaining the input focus within the first logical grouping by leaving the input focus on the last user interface object within the first logical grouping, even in the presence of a request to change the input focus; and rendering a display representation of the visual tree structure and presenting the display representation on a user interface display, with the input focus being visually depicted.

21. A computer storage medium having stored thereon computer executable instructions which, when executed, cause a computing system to perform the method of claim 20.

* * * * *

UNITED STATES PATENT AND TRADEMARK OFFICE
CERTIFICATE OF CORRECTION

PATENT NO. : 7,636,897 B2
APPLICATION NO. : 10/993672
DATED : December 22, 2009
INVENTOR(S) : Atanas Georgiev Koralski et al.

It is certified that error appears in the above-identified patent and that said Letters Patent is hereby corrected as shown below:

In column 1, line 25, after "creating" insert -- a --.

In column 1, line 28, delete "and" and insert -- an --, therefor

In column 1, line 29, delete "©" and insert -- ® --, therefor.

In column 7, line 25, delete "executer" and insert -- execute --, therefor.

In column 7, line 26, delete "of" and insert -- or --, therefor.

In column 7, line 28, delete "toe" and insert -- the --, therefor.

In column 7, line 29, delete "operation" and insert -- operating --, therefor.

In column 7, line 34, delete "operation" and insert -- operating --, therefor.

In column 7, line 35, delete "operation" and insert -- operations --, therefor.

In column 7, line 36, delete "and" and insert -- a --, therefor.

In column 15, line 25, in Claim 5, after "for" insert -- locating --.

In column 18, line 7, in Claim 20, delete "inasmuch" and insert -- in as much --, therefor.

In column 18, line 18, in Claim 20, delete "inasmuch" and insert -- in as much --, therefor.

In column 18, line 31, in Claim 20, delete "inasmuch" and insert -- in as much --, therefor.

In column 18, line 44, in Claim 20, delete "inasmuch" and insert -- in as much --, therefor.

Signed and Sealed this
Twenty-fifth Day of January, 2011

David J. Kappos
*Director of the United States Patent and Trademark Office*